Nov. 20, 1951      N. E. SIMONEAUX      2,575,773
CONVERTIBLE SEAT FOR AUTOMOBILES OR OTHER VEHICLES
Filed July 1, 1947      2 SHEETS—SHEET 1
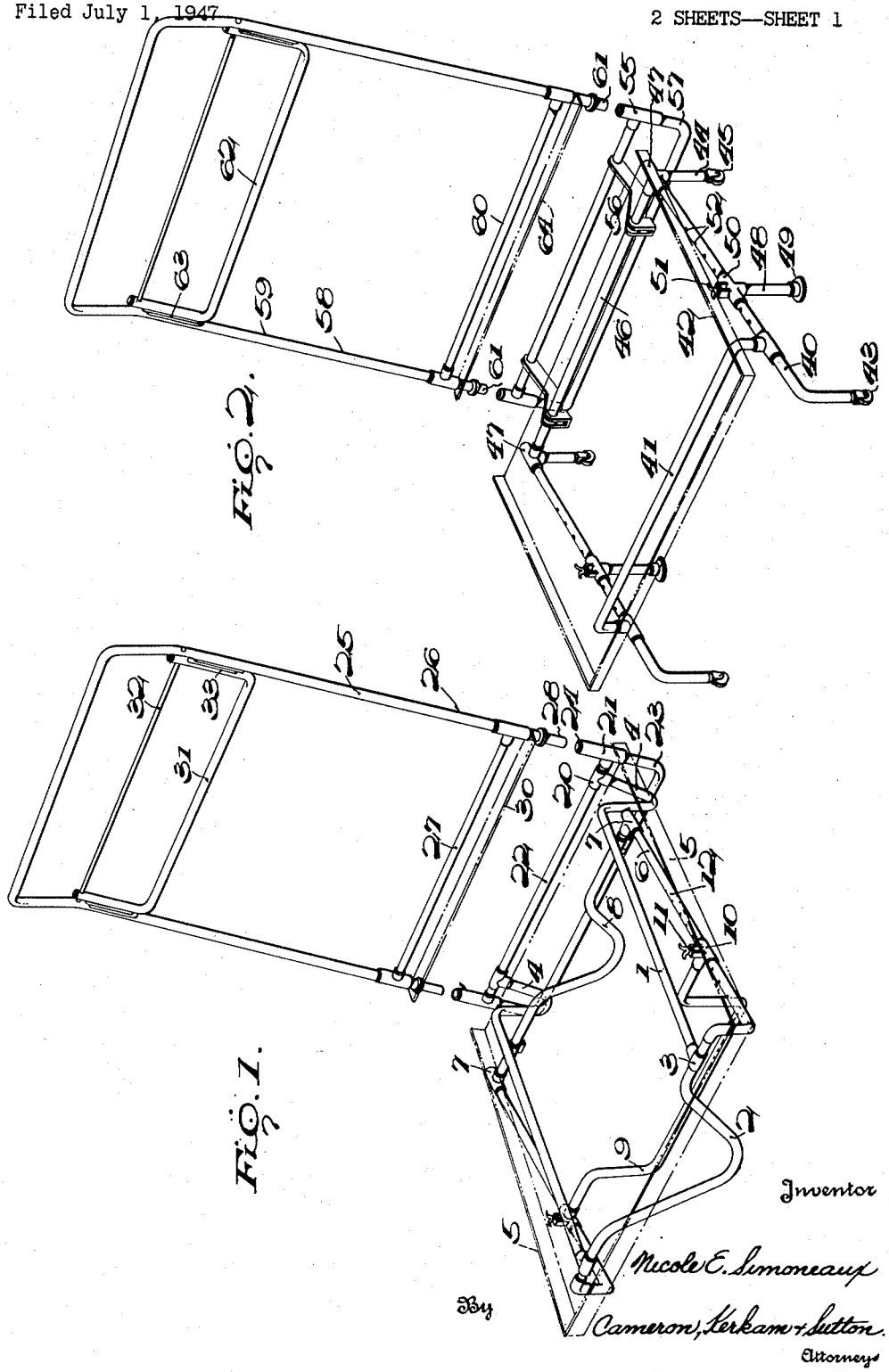

Nov. 20, 1951 N. E. SIMONEAUX 2,575,773
CONVERTIBLE SEAT FOR AUTOMOBILES OR OTHER VEHICLES
Filed July 1, 1947 2 SHEETS—SHEET 2
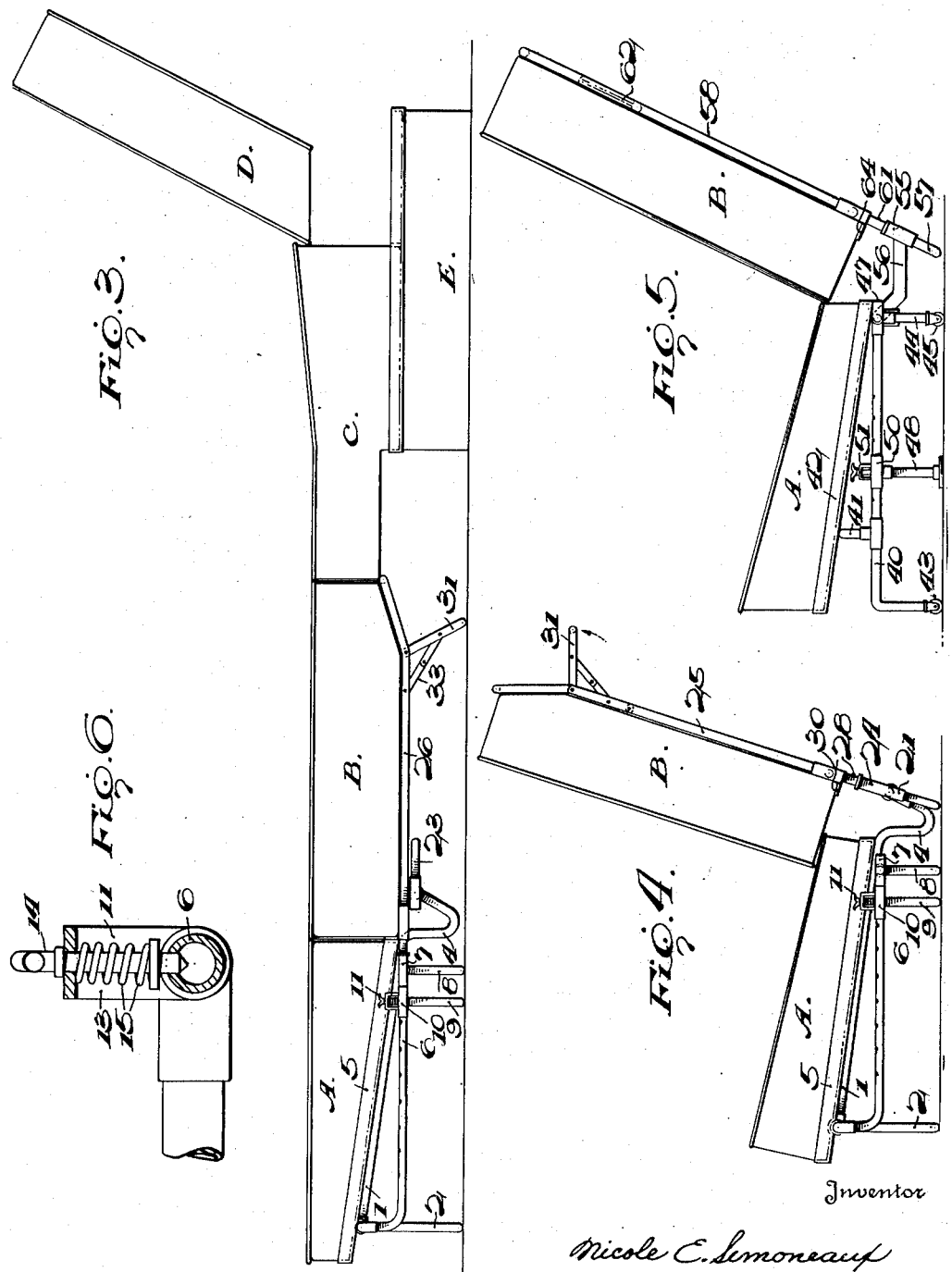
Inventor
Nicole E. Simoneaux
By Cameron, Kerkam & Sutton
Attorneys Patented Nov. 20, 1951

2,575,773

UNITED STATES PATENT OFFICE 2,575,773

CONVERTIBLE SEAT FOR AUTOMOBILES OR OTHER VEHICLES

Nicole E. Simoneaux, New Orleans, La.

Application July 1, 1947, Serial No. 758,379

4 Claims. (Cl. 155—7)

This invention pertains to improvements in convertible seats for automobiles or other vehicles in which the position of the front seat may be varied to provide for normal sitting or reclining, as desired. By dropping the back of the front seat to a horizontal position, as will be further explained, and by suitably adjusting the cushions of the seats of the conveyance a horizontal couch or bed may be rapidly evolved therefrom. The reconversion to a sitting arrangement may be as rapidly accomplished.

The need for a practical, convertible seat structure of this type has long been felt, particularly in view of the increase in automobile travel. The present invention presents a simple and sturdy frame structure which may be converted to the desired position rapidly without the use of auxiliary elements.

It is a primary object of the invention to provide a convertible seat structure which is strong and stable in either vertical or horizontal position and which may be rapidly and simply converted to the desired position.

It is a further object of the invention to provide such a seat structure which is adaptable to many different types of conveyances.

Other and further objects of the invention will become apparent as this specification proceeds.

Referring to the drawings,

Fig. 1 is a perspective view of one embodiment of convertible frame structure for a front seat;

Fig. 2 is a perspective view of another embodiment of a convertible frame for a front seat;

Fig. 3 is a side elevation of the invention as applied to the average five passenger automobile with the seats and cushions converted into a horizontal couch;

Fig. 4 is a side elevation of one embodiment of the front seat structure in normal position, for sitting;

Fig. 5 is a side elevation of an alternative embodiment of the front seat structure in normal position for sitting; and Fig. 6 is a view partially in section of the locking device for regulating the longitudinal position of the frame of the front seat.

It will be noted from Figs. 1 and 2 that the frame for the convertible front seat is preferably constructed of metal tubing. In Fig. 1, I indicates a pair of longitudinal angularly disposed bars which are connected at their forward extremities by curved brace 2 attached thereto by means of sleeve caps 3 and slidably engaging the floor of the vehicle. Bars I are provided with V-shaped members 4 at their rearward extremities, which, as shown, preferably are clear of the floor of the vehicle and provide a resilient support for the seat back when in upright position. Flanged member 5, preferably in the form of a shallow rectangular frame, is suitably affixed to bars I to provide a mounting for seat cushion A. Side rails 6 are shown extending downwardly and rearwardly from sleeves 3, above floor level. Side rails 6 are preferably constructed of L-shaped tubing and carry female ferrules 7 at their rear extremities. Curved brace 8 is shown joining the extremities of side rails 6 and extending downwardly to slidably engage the floor. Adjustable brace member 9, preferably formed of rectangularly bent tubing is shown slidably mounted upon side rails 6 as by cylindrical sleeves 10. Brace member 9 is preferably affixed to the floor of the vehicle and provides a rigid, fixed support for the seat frame and a base for adjustment of the seat frame in the desired longitudinal position. Sleeves 10 carry spring latches 11 which register with suitable holes 12 bored into side rails 6. Referring to Fig. 6, latches 11 comprise cylindrical body 13, pin 14 and spring 15 so arranged that removal of pin 14 from holes 12 in side rails 6 is resisted by spring 15. As shown, latches 11 are mounted vertically on sleeves 10. As an alternative latches 11 may be mounted angularly with respect to sleeves 10 to make them more easily accessible.

Cylindrical sleeves 20 are horizontally mounted at the upper extremities of feet 4 and are designed to support back frame support 21 which is pivotally mounted therein by means of bar 22. The lower portion of back frame support 21 comprises U-bar 23 which braces against feet 4 when the back frame support is in upright position. Female ferrules 24 are disposed at the upper extremities of back frame support 21.

Back frame 25 is preferably formed of rectangularly bent tubing and comprises side rails 26 appropriately braced by cross brace 27. Male ferrules 28 are disposed at the lower extremities of side rails 26 and are designed to closely fit female ferrules 24 when the back is in upright position and female ferrules 7 when the back is in horizontal position. Angle bar 30 supporting back cushion B is shown appropriately mounted across rails 26 adjacent male ferrules 28. As shown, the upper portion of back frame 25 is angularly inclined to the frame. Brace 31 is shown pivotally mounted at the upper extremity of frame 25 by means of rod 32. Extensible sway braces 33 are provided pivotally mounted between side rails 26 and brace 31 in such fashion as to hold brace 31 rigidly when in extended position.

An alternative embodiment of the frame structure for the front seat is shown in Fig. 2. In this figure side rails 40 preferably formed of L-shaped tubing, carry brace 41 mounted adjacent their forward extremities. Rectangular seat supporting flange 42 is angularly mounted upon brace 41 at its forward extremity and on side rails 40 at its rearward extremity. Rollers 43 are rotatably mounted in the forward lower extremities of rails 40 and legs 44 carrying rollers 45 are vertically mounted at the rearward extremities of rails 40 in such fashion that the entire seat frame may be moved longitudinally upon the floor of the vehicle on rollers 43 and 45. Brace 46 is provided joining side rails 40 at their rear extremities. Female ferrules 47 are mounted horizontally at the ends of side rails 40.

Braces 48 are provided with feet 49 which are preferably screwed or otherwise permanently affixed to the floor of the vehicle. At their upper extremities braces 48 carry cylindrical sleeves 50 which slidably engage side rails 40. Sleeves 50 carry spring latches 51 in such fashion that the pins thereof engage holes 52 in side rails 40. The structure of spring latches 51 is identical with that of spring latches 11 described in connection with Fig. 1.

Female ferrules 55 and supporting frame 57 are shown angularly mounted at the rear of the seat frame by means of arms 56 affixed to brace 46. As shown in Fig. 5 female ferrules 55 and frame 57 are preferably disposed at an angle of approximately 120° to the horizontal, frame 57 clearing the vehicle floor to provide resiliency to the seat back.

Back supporting frame 58, preferably formed of rectangularly bent tubing, comprises side rails 59 braced by cross brace 60. Side rails 59 carry male ferrules 61 at their lower extremities, designed to fit female ferrules 55 and 47 when the back is respectively in upright or horizontal position. Back frame 58 carries brace 62 pivotally mounted adjacent its upper extremity. Brace 62 is designed to support back frame 58 against the floor of the vehicle when in horizontal position and is appropriately braced when in extended position by sway braces 63 which are pivotally mounted between it and side rails 59. Angle bar 64, designed to support back cushion B, is affixed to frame 58 adjacent male ferrules 61.

Referring to Fig. 3 of the drawings, A designates the front seat cushion, B the back cushion for the front seat, C the seat cushion for the rear seat and D the back cushion for the rear seat. The front seat frame structure shown in this figure is that disclosed in Fig. 1 of the drawings. When it is desired to convert the seats of the vehicle into a horizontal lounge utilizing the front seat frame shown in Fig. 1, the following steps are taken. Back frame 25 is raised vertically until male ferrules 28 are free of female ferrules 24. Back frame support 21, carrying female ferrules 24 is then turned to horizontal position in sleeves 20. Seat cushion A is then reversed so that its wider front edge is disposed in the rearward end of frame 5. Back frame 25 is then lowered to a horizontal position, brace 31 having been swung outwardly to fully extended position, and male ferrules 28 are inserted into female ferrules 7 of side rails 6. Back frame 25 is pushed forwardly until cushions A and B contact each other. Spring latches 11 are then raised and side rails 6 are slid forwardly in sleeves 10 until the desired longitudinal position of front cushion A is attained. Spring latches 11 are then released to hold the assembly in forward position. Male ferrules 28 may be of sufficient length to pass through female ferrules 7 into rails 6 and may be bored adjacent their extremities to permit them to be locked in position by spring latches 11 when the seat frame is in extreme forward position. Rear cushion C is reversed and slid forwardly on its base E until its forward edge contacts the rearward edge of cushion B and rests on the extremity of back frame 25 and the formation of the couch is complete. As shown, cushion C is preferably cut away at its lower front extremity (reversed position) to allow the cushion to be slid forwardly in its frame to increase the length of the couch.

When the embodiment of the front seat frame shown in Fig. 2 is used substantially the same operation is performed, the front seat framework being rolled forward on rollers 43 and 45 until the desired position is reached and spring latches 51 then being released to hold the frame in advanced position. Male ferrules 61 of back frame 58 are removed from female ferrules 55, the back frame is lowered to horizontal position and male ferrules 61 are inserted into female ferrules 47 of side rails 40. In this embodiment of the invention female ferrules 55 and frame 57 provide support to back cushion B of the assembly when in horizontal position, additional rigidity being provided by extended brace 62 which rests upon the floor of the vehicle.

As an alternative, in each embodiment, the lower extremities of the back frame may carry female ferrules, male ferrules being provided on the base frame for registration therewith.

If a comparatively short lounge is desired the lower portion of the frame of the front seat and rear cushion C may be left in normal position, cushion B being moved to a horizontal position to fill the space therebetween and cushion A being reversed. If an extended lounge is desired, the frame of the front seat is slid forward the desired distance on its side rails, latches 11 or 51 being freed, and rear seat cushion C moved forward a corresponding distance. When the desired length is attained latches 11 or 51 are seated in the side rails to maintain the position. It will thus be seen that a horizontal couch of substantially any desired length may be formed.

The side rail and latch structure also provides an efficient and simple means for adjusting the longitudinal position of the front seat when in upright or driving position.

The foregoing constructions provide a seating structure for vehicles which is extremely stable when in normal position and which may be quickly and easily converted to a lounge or bed by the operations indicated. It is contemplated that bath halves of the front seat will be provided with the convertible framework and the rear seat so divided along its median line that the right-hand seats of the vehicle may be converted to a couch while the left-hand seats remain in normal position. Such a structure makes it possible for passengers in the car to recline while the operator drives, and also makes for ease of conversion by reducing the weight of the seat back.

The invention is susceptible of other embodiments without departing from the spirit thereof. Attention is directed to the appended claims for limitation of its scope.

What is claimed is:

1. In a convertible seat for vehicles, parallel base members, curved supports disposed at the rear of said base members, brace members for said base members extending downwardly therefrom and slidably engaging the floor of the vehicle, side rails attached to said base members and extending rearwardly therefrom, an adjustable brace member for said side rails slidably engaging said side rails at its upper extremities and affixed to the vehicle floor at its lower extremity, female ferrules affixed to the rear extremities of said side rails and extending horizontally with respect thereto, a back frame support mounted on the rearward extremity of said base members, female ferrules affixed to said back frame support and maintained thereby in a substantially vertical position, a back frame for said seat, male ferrules affixed at the lower extremities of said back frame and seating in said upright ferrules and adapted to seat in the side rail ferrules whereby said seat may be converted to horizontal position.

2. In a convertible seat for vehicles, parallel side bars, curved supports disposed at the rear of said side bars, brace members for said side bars extending downwardly therefrom and slidably engaging the floor of the vehicle, side rails affixed to said side bars at their forward extremities and extending rearwardly and downwardly therefrom, an adjustable brace member for said side rails slidably engaging said side rails at its upper extremities and affixed to the floor of the vehicle at its lower extremity, female ferrules extending horizontally from the rear extremities of said side rails, a back frame support mounted on the rear extremity of said side bars, female ferrules affixed to said back frame support and maintained thereby in a substantially vertical position, a back frame for said seat, male ferrules affixed at the lower extremities of said back frame and seating in said upright ferrules and adapted to seat in the side rail ferrules whereby said seat may be converted to horizontal position.

3. In a convertible frame for seat structures, parallel base members, curved supports disposed at the rear of said base members, braces affixed to said base members extending downwardly therefrom and slidably engaging the floor of the vehicle, side rail members affixed to said base members and extending downwardly and rearwardly therefrom, an adjustable brace member for said frame slidably engaging said side rail members at its upper extremities and fixedly mounted on the vehicle floor at its lower extremity, ferrules mounted at the rear extremities of said side rails, a back frame support pivotally mounted at the upper extremities of said curved supports, ferrules mounted on the upper extremities of said bracket, a back frame, ferrules mounted at the lower extremities of said back frame and seating in said upright ferrules and adapted to seat in the side rail ferrules whereby said seat may be converted to horizontal position.

4. In a convertible frame for seat structures, parallel base members, curved supports disposed at the rear of said base members, braces for said base members extending downwardly therefrom and slidably engaging the vehicle floor, side rails affixed to said base members and extending downwardly and rearwardly therefrom, a brace member joining said side rails at their rear extremities and slidably engaging the vehicle floor, an adjustable brace member slidably engaging said side rails at its upper extremities and affixed to the vehicle floor at its lower extremity, ferrules mounted at the rear extremities of said side rail members and extending horizontally with respect thereto, a back frame support pivotally mounted in the upper extremities of said curved supports, ferrules carried by said back frame support in a substantially vertical position, a back frame for said structure, ferrules carried at the lower extremities of said back frame and seating in said upright ferrules and adapted to seat in said side rail ferrules whereby said seat may be converted to horizontal position.

NICOLE E. SIMONEAUX.

REFERENCES CITED

The following references are of record in the file of this patent:

UNITED STATES PATENTS

| Number | Name | Date |
| --- | --- | --- |
| 294,198 | Clark | Feb. 26, 1884 |
| 1,873,525 | Allbright | Aug. 23, 1932 |
| 1,905,605 | Richardson | Apr. 25, 1933 |
| 2,009,016 | Robinson | July 23, 1935 |
| 2,320,370 | Luker | June 1, 1943 |